US011588345B2

(12) United States Patent
Nguyen et al.

(10) Patent No.: US 11,588,345 B2
(45) Date of Patent: *Feb. 21, 2023

(54) CONCURRENT ALTERNATING-CURRENT AND DIRECT-CURRENT

(71) Applicant: HEWLETT PACKARD ENTERPRISE DEVELOPMENT LP, Houston, TX (US)

(72) Inventors: Hai Ngoc Nguyen, Houston, TX (US); Abhishek Banerjee, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 157 days.

This patent is subject to a terminal disclaimer.

(21) Appl. No.: 17/073,518

(22) Filed: Oct. 19, 2020

(65) Prior Publication Data

US 2021/0036543 A1 Feb. 4, 2021

Related U.S. Application Data

(63) Continuation of application No. 15/774,703, filed as application No. PCT/US2016/015426 on Jan. 28, 2016, now Pat. No. 10,840,734.

(51) Int. Cl.
*H02J 7/00* (2006.01)
*H02J 9/06* (2006.01)
(Continued)

(52) U.S. Cl.
CPC ............... *H02J 9/06* (2013.01); *G06F 1/263* (2013.01); *H02M 7/02* (2013.01); *H02J 2207/40* (2020.01)

(58) Field of Classification Search
USPC ........................................................ 320/128
See application file for complete search history.

(56) References Cited

U.S. PATENT DOCUMENTS 5,784,626 A 7/1998 Odaohara
6,201,371 B1 * 3/2001 Kawabe .................. H02J 9/062
320/121
(Continued)

FOREIGN PATENT DOCUMENTS

JP 2000308280 A 11/2000
JP 2005354781 A 12/2005
WO WO-0143266 A1 6/2001

OTHER PUBLICATIONS

Razvan-Daniel, A. et al., "High Reliability Single-Phase Uninterruptible Power Supply," Journal of Electrical and Electronics Engineering Research, vol. 3(2), Feb. 2011, pp. 18-26.
(Continued)

*Primary Examiner* — Samuel Berhanu
(74) *Attorney, Agent, or Firm* — Hewlett Packard Enterprise Development LP

(57) ABSTRACT

Example implementations relate to concurrent alternating-current and direct-current. In one example, a device comprises a power module connected to a first power outlet, the power module connected to a second power outlet, and a controller to the power module to concurrently provide alternating-current (AC) power to the first power outlet and direct-current (DC) power to the second power outlet by switching a transistor including switching circuitry in response to an absence of AC input power to the device.

20 Claims, 3 Drawing Sheets

(51) Int. Cl.
    *G06F 1/26*        (2006.01)
    *H02M 7/02*        (2006.01)

(56)            References Cited

U.S. PATENT DOCUMENTS 7,050,312  B2      5/2006   Tracy et al.
    7,206,944  B2      4/2007   Odaohhara et al.
    7,391,132  B2      6/2008   Chen
    7,701,083  B2      4/2010   Savage
    7,763,990  B2 *    7/2010   Lee .................. H02J 9/061
                                                          307/26
    7,804,195  B2      9/2010   Hung et al.
    2009/0152947 A1    6/2009   Wang
    2012/0228944 A1    9/2012   Koshin et al.
    2013/0258109 A1*   10/2013  Muraoka ............ G08B 13/1968
                                                          348/152
    2015/0137595 A1    5/2015   Xu et al.

OTHER PUBLICATIONS

International Search Report and Written Opinion received for PCT Application No. PCT/US2016/015426, dated Oct. 12, 2016, 10 pages.

* cited by examiner

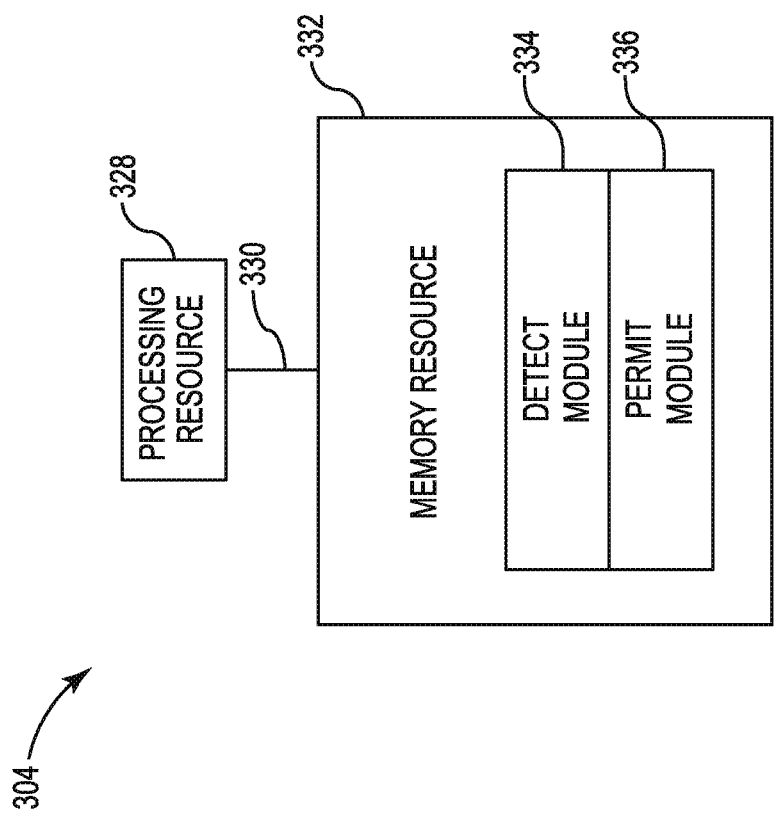

US 11,588,345 B2

CONCURRENT ALTERNATING-CURRENT AND DIRECT-CURRENT

CROSS-REFERENCE TO RELATED APPLICATIONS

This application is a continuation of U.S. patent application Ser. No. 15/774,703, filed on May 9, 2018, the entire contents of which are incorporated by reference herein. Applicant hereby rescinds any disclaimer of claim scope in the parent applications or the prosecution history thereof and advises the USPTO that the claims in this application may be broader than any claim in the parent applications.

BACKGROUND

Power disruption may cause damage to electrical equipment. A device such as an uninterruptible power supply (UPS) may provide protection to electrical equipment in the event of a power disruption. For example, a UPS may provide time to shut down the electrical equipment or to allow for an alternate power source for the electrical equipment to be enabled.

BRIEF DESCRIPTION OF THE DRAWINGS

FIG. 3 illustrates an example of a controller according to the disclosure.

DETAILED DESCRIPTION

A UPS may provide power during a power disruption to electrical equipment via an energy storage element of the UPS. For example, a UPS may provide power stored in batteries and/or capacitors of the UPS to the electrical equipment.

A type of power from a UPS may depend on a type of electrical equipment coupled to the UPS. For example, in the event of a power disruption, certain electrical equipment may necessitate alternating-current (AC) power, while other electrical equipment may necessitate direct-current (DC) power.

Figure 1:
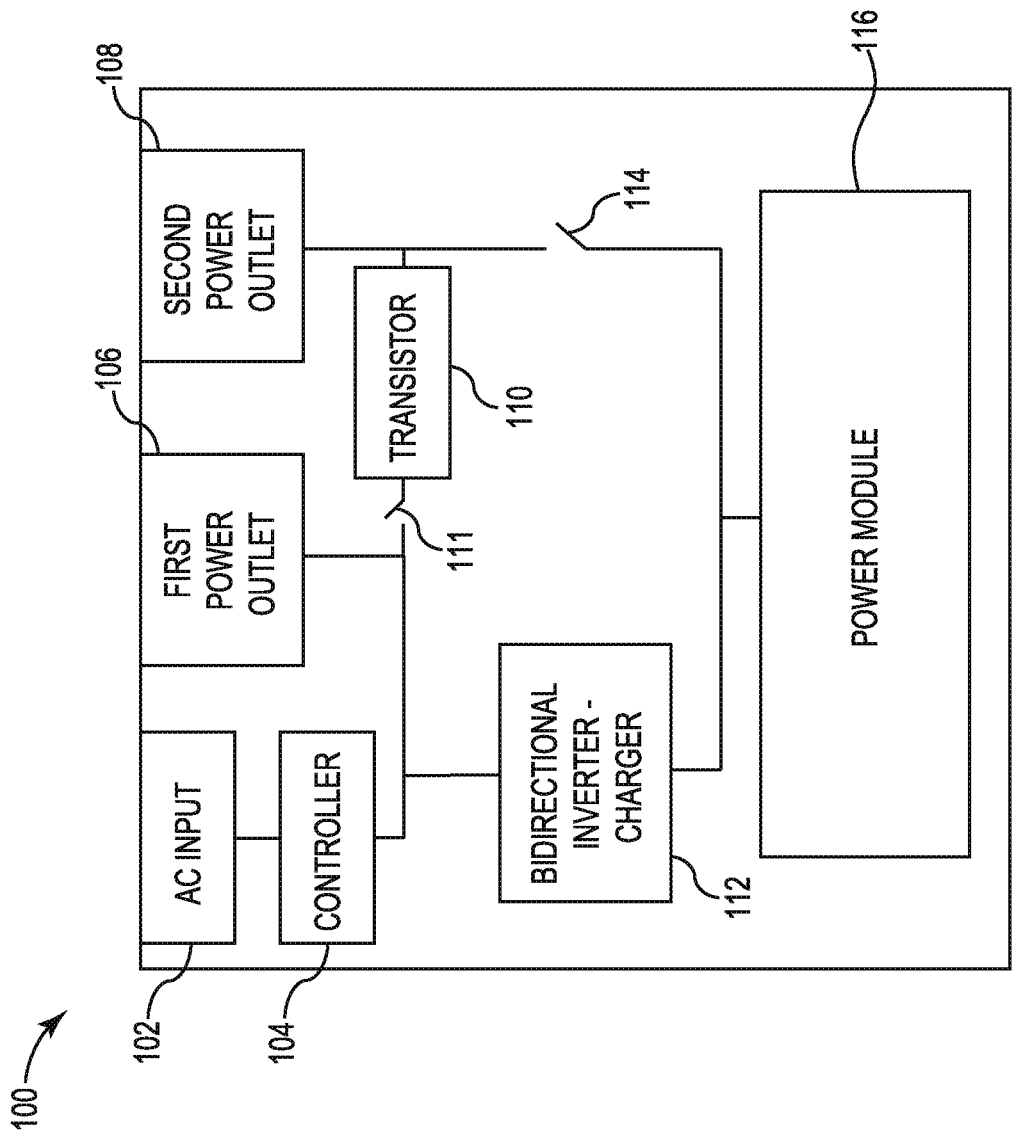
FIG. 1 is a block diagram of an example of a device providing concurrent alternating-current and direct-current according to the disclosure.

Accordingly, examples of the disclosure include concurrent alternating-current and direct-current and methods and devices employing concurrent alternating-current and direct-current. In an example, a device comprises a power module connected to a first power outlet, the power module connected to a second power outlet, and a controller to the power module to concurrently provide alternating-current (AC) to the first power outlet and direct-current (DC) to the second power outlet by switching a transistor including switching circuitry in response to an absence of AC input power to the device, FIG. 1 is a block diagram of an example of a device 100 providing concurrent alternating-current and direct-current according to the disclosure. The device 100 may include an AC input 102, a controller 104, a first power outlet 106, a second power outlet 108, a transistor 110 with switching circuitry 111, a bidirectional inverter-charger 112, a switch 114, and a power module 116.

As illustrated in FIG. 1, device 100 may include a power module 116 connected to a first power outlet 106. A device may refer to an uninterruptible power supply (UPS), an uninterruptible power source, or other electrical apparatus to provide power to a load when an AC input power source to the load is lost.

As used herein, a power module may refer to an energy storage element capable of providing stored electrical energy to a power outlet. For example, power module 116 may be comprised of a plurality of batteries, capacitors, supercapacitors, and/or other energy storage elements.

Power module 116 may be connected to a first power outlet 106. As used herein, a power outlet may refer to a socket connected to an energized electrical circuit and/or an electrical circuit capable of being energized. The first power outlet 106 may include holes (e.g., female) that may receive protruding prongs, blades, or pins (e.g., male) of a plug in order to complete an electrical connection from the socket to the plug.

Power module 116 may be connected to first power outlet 106 by a bidirectional inverter-charger 112. As used herein, a bidirectional inverter-charger may refer to an electrical circuit capable of converting AC to DC, as well converting DC to AC. Power module 116 may provide AC to first power outlet 106 by bidirectional inverter-charger 112 in response to an absence of AC input power to device 100 from AC input 102, as is described herein.

Power module 116 may be connected to a second power outlet 108. Similar to first power outlet 106, second power outlet 108 may include holes (e.g., female) that may receive protruding prongs, blades, or pins (e.g., male) of a plug in order to complete an electrical connection from a socket to a plug.

Power module 116 may be connected to second power outlet 108 by a switch 114. As used herein, a switch may refer to an electrical circuit capable of capable of interrupting, altering a path of, and/or otherwise adjusting power to second power outlet 108. Switch 114 may be a DC output silicon-controlled rectifier (SCR), although examples of the disclosure are not so limited. As used herein, an SCR refers to a semi-conductor or integrated circuit that allows for control of current. Power module 116 may provide DC to second power outlet 108 via switch 114 in response to an absence of AC input power to device 100 from AC input 102, as is described herein.

In some examples, a voltage from power module 116 to second power outlet 108 may need to be modified. For example, a voltage provided by power module 116 may need to be modified for use by an external device that may be coupled to second power outlet 108. In examples where a voltage to second power outlet 108 may need to be modified, a DC-DC converter may be used to change the voltage from power module 116 to a different voltage.

The first power outlet 106 and the second power outlet 108 may be connected by a transistor 110 including switching circuitry 110. The transistor 110 including switching circuitry 111 may be capable of interrupting, altering a path of, and/or otherwise adjusting power to second power outlet 108. For example, the transistor 110 can interrupt power supplied to second power outlet 108 by electrically opening, latching, and/or otherwise causing power to cease flowing from AC input 102 to second power outlet 108 in the event power from AC input 102 is lost, such that an external device that may be coupled to second power outlet 108 does not receive AC from power module 116, as is described herein.

In some examples, transistor 110 can be a metal-oxide-semiconductor-field-effect transistor (MOSFET) or an insulated-gate bipolar transistor (IGBT). Although transistor 110 is described as being a MOSFET or IGBT, examples of the disclosure are not so limited. For example, transistor 110 may be any other suitable type of transistor to promote concurrent alternating-current and direct-current.

Controller 104 may cause AC power from AC input 102 to be provided to first power outlet 106 and second power outlet 108 when AC input 102 is providing power to device 100. For example, when power is being supplied to device 100 by AC input 102, AC may be directed to first power outlet 106 and further to second power outlet 108 via the transistor 110 with switching circuitry 111. The transistor 110 with switching circuitry 111 is in a closed position while power from AC input 102 is being provided to device 100. The closed position of the transistor 110 with switching circuitry 111 may allow AC power from AC input 102 to flow to first power outlet 106 as well as to second power outlet 108. That is, while AC input 102 is providing power to device 100, the transistor 110 with switching circuitry 111 is in a closed position allowing AC power output at first power outlet 106 and second power outlet 108.

Controller 104 may include a processing resource in communication with a memory resource to detect a connection of an AC input 102 to device 100. Controller 104 may correspondingly detect an absence of a connection of an AC input 102 to device 100. Controller 104 is analogous to controller 304 as referenced in FIG. 3.

Controller 104 may cause AC input power from AC input 102 to be provided to power module 116 via bidirectional inverter-charger 112 when AC input 102 is providing AC power to device 100, For example, when AC power is being supplied to device 100, AC power may be directed to bidirectional inverter-charger 112. When AC power is being supplied to device 100, bidirectional inverter-charger 112 may convert AC power from AC input 102 to DC power. The converted DC power may be provided to power module 116 to allow power module 116 to collect and/or store electrical energy. That is, while AC input 102 is providing AC power to device 100, AC power may be converted to DC power via bidirectional inverter-charger 112 and stored by power module 116.

Controller 104 of device 100 may cause power module 116 to concurrently provide AC power to first power outlet 106 and DC power to second power outlet 108 in response to an absence of AC input power from AC input 102 to device 100. That is, in the event of a power disruption to device 100 (e.g., a loss of AC input power from AC input 102), controller 104 may cause AC power to be provided to first power outlet 106 concurrently with DC power being provided to second power outlet 108.

Controller 104 may cause transistor 110 with switching circuitry 111 to permit power module 116 to provide AC power to first power outlet 106 and concurrently permit power module 116 to provide DC power to second power outlet 108 in response to an absence of AC input power from AC input 102 to device 100. That is, controller 104 may detect an absence of AC input power from AC input 102 to device 100, and concurrently permit power module 116 to provide AC power to first power outlet 106 and DC power to second power outlet 108.

Permitting the transistor 110 with switching circuitry 111 to concurrently provide AC power to first power outlet 106 and DC power to second power outlet 108 may include switching a transistor to an open position. For example, switching the transistor 110 with switching circuitry 111 open causes a break in the connection of first power outlet 106 and second power outlet 108. That is, switching the transistor 110 with switching circuitry 111 open prevents current from flowing between first power outlet 106 and second power outlet 108 during an absence of AC input power to device 100 from AC input 102.

In response to an absence of AC input power from AC input 102 to device 100, AC power may be provided to first power outlet 106 from power module 116 via bidirectional inverter-charger 112. For example, current in the form of DC power may flow from power module 116 to bidirectional inverter-charger 112. Bidirectional inverter-charger 112 may convert DC power from power module 116 to AC power. AC power may then flow from bidirectional inverter-charger 112 to first power outlet 106.

DC power may be provided concurrently to second power outlet 108 via switch 114 in response the absence of AC input power from AC input 102 to device 100. For example, switch 114 may be switched closed to allow current in the form of DC power to flow from power module 116 to second power outlet 108 through switch 114.

As illustrated in FIG. 1, device 100 includes a single first power outlet 106 and a single second power outlet 108. However, examples of the disclosure are not so limited to a single first power outlet 106 and a single second power outlet 108. For example, first power outlet 106 may represent more than one power outlet and second power outlet 108 may represent more than one power outlet.

Providing concurrent AC power and DC power from device 100 in the event of a power disruption may allow for a device such as a UPS to provide simultaneous backup power to different electrical equipment load specifications. Providing AC power and DC power to different electrical equipment may allow for the electrical equipment to be installed and/or located in the same system and/or rack.

Figure 2:
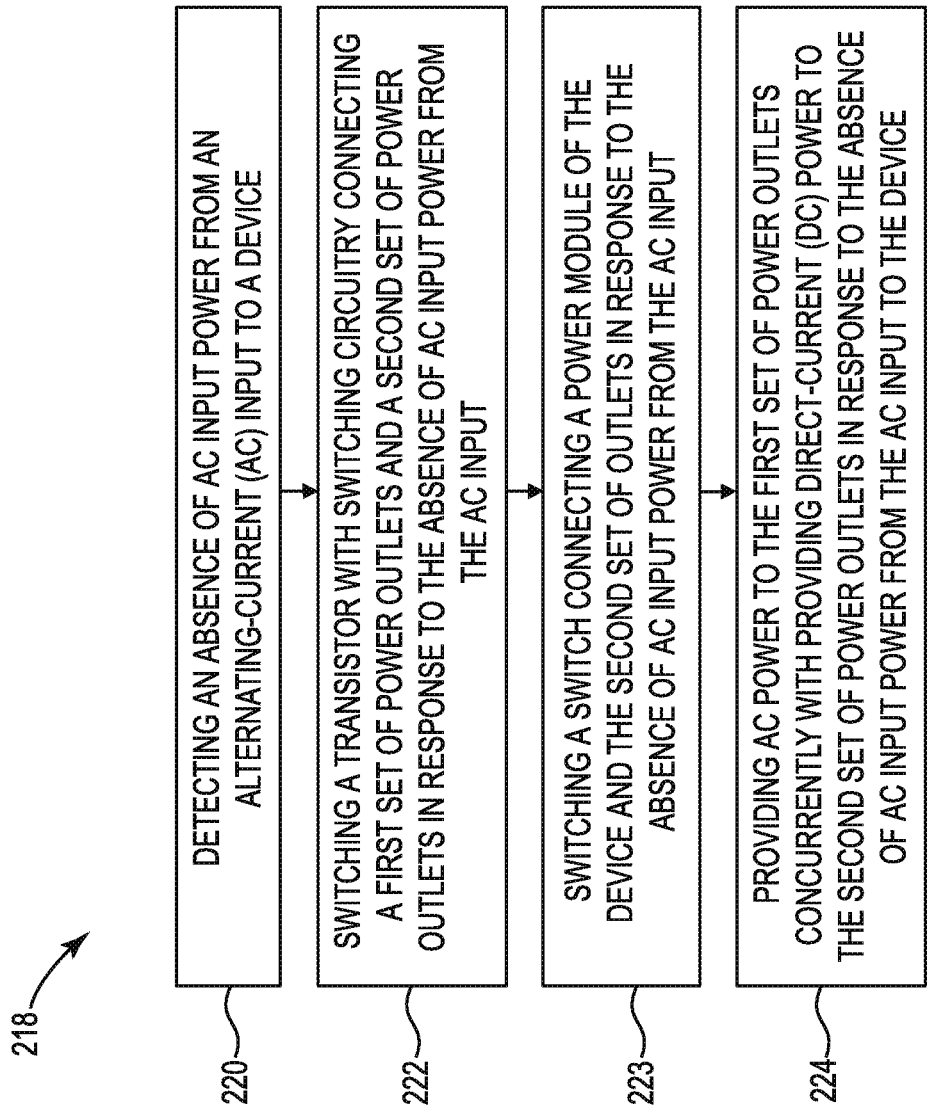
FIG. 2 is a flow chart illustrating an example of a method of providing concurrent alternating-current and direct-current according to the disclosure.

FIG. 2 is a flow chart illustrating an example of a method 218 of providing concurrent alternating-current and direct-current according to the disclosure. For example, method 218 may be performed by a controller (e.g., controller 104 and/or controller 304, described in connection with FIGS. 1 and 3, respectively) of a device to provide concurrent alternating-current and direct-current in the absence of AC input power to a device.

AC input power is provided to the device from an AC input when no power disruption to the device is occurring. When the device is receiving AC input power from the AC input, DC power may be provided to a power module of the device. DC power may be provided to the power module of the device via a bidirectional inverter-charger, where the bidirectional inverter-charger converts AC power received at the device from the AC input, to DC power to allow the power module of the device to store electrical energy.

AC power may be provided to the first set of power outlets and the second set of power outlets when the AC input is providing power to the device. For example, AC power to the device may flow from the AC input to the first set of power outlets and to the second set of power outlets, where the first set of power outlets and the second set of power outlets are connected by a transistor with switching circuitry.

While the device is receiving AC power from the AC input, the transistor with switching circuitry may be in a closed position, enabling a connection between the first set of power outlets and the second set of power outlets. That is, the connection between the first set of power outlets and the second set of power outlets via the transistor with switching circuitry may allow for current to flow from the AC input to the first set of power outlets and to the second set of power outlets.

At 220, the method 218 may include detecting an absence of AC input power from an alternating-current (AC) input to a device. For example, during normal operation of the device, the device receives AC input power from an AC input; during a power disruption to the device, the controller may detect the absence of AC input power from the AC input to the device.

At 222, the method 218 may include switching a transistor with switching circuitry connecting a first set of power outlets and a second set of power outlets in response to the absence of AC input power from the AC input. For example, the controller may switch the transistor with switching circuitry in order to break the connection between the first set of power outlets and the second set of power outlets, Breaking the connection between the first set of power outlets and the second set of power outlets can ensure no current from a power module flows from a bidirectional inverter-charger to the second set of power outlets, as well as ensuring no current from the power module flows from a switch to the first set of power outlets.

Switching the transistor with switching circuitry in response to the absence of AC input power from the AC input may include switching the transistor open. Switching the transistor with switching circuitry open prevents current from flowing between the first set of power outlets and the second set of power outlets.

At 223, the method 218 may include switching a switch connecting the power module of the device and the second set of power outlets in response to the absence of AC input power from the AC input. For example, the controller may switch the switch connecting the power module to the second set of power outlets to enable a connection between the power module and the second set of power outlets.

At 224, the method 218 may include providing AC power to the first set of power outlets concurrently with providing direct-current (DC) power to the second set of power outlets in response to the absence of AC input power from the AC input to the device. For example, a power module of the device may provide AC power to the first set of power outlets, and concurrently provide DC power to the second set of power outlets.

The power module may provide AC power to the first set of power outlets by the bidirectional inverter-charger. For example, DC power from the power module may be converted to AC power by the bidirectional inverter-charger connecting the power module and the first set of power outlets. The AC power converted from DC by the bidirectional inverter-charger may then be provided to the first set of power outlets.

The power module may provide DC power to the second set of power outlets by the switch. For example, DC power from the power module may be provided to the second set of power outlets via the switch.

A DC voltage of the DC power from the power module may be modified before being provided to the second set of power outlets. For example, the DC voltage of the DC power from the power module may be modified by a DC-DC converter connecting the power module, the switch, and the second set of power outlets.

The transistor with switching circuitry connecting the first set of power outlets and the second set of power outlets may be closed in response to power from the AC input to the device being reestablished. For example, when AC input power from the AC input to the device is reestablished, the transistor with switching circuitry may be switched closed, preventing power module from concurrently providing AC power and DC power to the first set of power outlets and the second set of power outlets, respectively, and allowing AC power to be supplied to the first and the second set of power outlets from the AC input.

The switch connecting the second set of power outlets and the power module may be switched open in response to power from the AC input being reestablished. For example, when AC input power form the AC input is reestablished, the switch may be switched open, preventing power module from providing DC power to the second set of power outlets.

FIG. 3 illustrates an example of a controller according to the disclosure. The controller 304 can include a processing resource 328 in communication with a memory resource 332. The memory resource 332 can include instructions, executable by the processing resource 328 to perform a number of functions described herein.

The controller 304 can utilize software, hardware, firmware, and/or logic to perform a number of functions. The controller 304 can include a combination of hardware and program instructions to perform a number of functions (e.g., actions). For instance, in some examples the controller 304 can include an application specific integrated circuit (ASIC). The hardware, for example, can include a processing resource 328 and a memory resource 332, such as a machine-readable medium (MRM) and/or other memory resource.

The memory resource 332 can be internal and/or external to the controller 304 (e.g., the controller can include an internal memory resource and/or have access to an external memory resource). The program instructions (e.g., machine-readable instructions (MRI)) can include instructions stored on the MRM to implement a particular function. The set of MRI can be executable by the processing resource 328. The memory resource 332 can be coupled to the controller 304 in a wired and/or wireless manner. For example, the memory resource 332 can be an internal memory, a portable memory, a portable disk, and/or a memory associated with another resource (e.g., enabling MRI to be transferred and/or executed across a network such as the Internet).

Memory resource 332 is non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, optical discs, digital versatile discs (DVD), Blu-ray discs (BD), compact discs (CD), and/or a solid state drive (SSD), etc., as well as other types of machine-readable media.

The processing resource 328 can be coupled to the memory resource 332 via a communication path 330. The communication path 330 can be local or remote to controller 304. Examples of a local communication path 330 can include an electronic bus internal to a machine, where the memory resource 332 can be in communication with the processing resource 328 via the electronic bus. Examples of such electronic buses can include Industry Standard Architecture (ISA), Peripheral Component Interconnect (PCI), Advanced Technology Attachment (ATA), Small Computer System Interface (SCSI), USB, among other types of electronic buses and variants thereof. The communication path 330 can be such that the memory resource 332 is remote from the processing resource 328, such as in a network connection between the memory resource 332 and the processing resource 328. That is, the communication path 330 can be a network connection, Examples of such a network connection can include local area network (LAN), wide area network (WAN), personal area network (PAN), and the Internet, among others.

As shown in FIG. 3, the MRI stored in the memory resource 332 can be segmented into a number of modules 334, 336 that when executed by the processing resource 328 can perform a number of functions including those described herein. That is, as used herein a module includes instructions included to perform a particular task or action. The number of modules 334, 336 can be sub-modules of other modules. For example, a detect module 334 can be a sub-module of a permit module 336 and/or the detect module 334 and the permit module 336 can be included within a single module. Furthermore, the number of modules 334, 336 can comprise individual modules separate and distinct from one another. Examples are not limited to the specific modules 334, 336 illustrated in FIG. 3.

The detect module 334 can detect a connection of an alternating-current (AC) input. In some examples, detect module 334 can detect the presence of AC input power from an AC input into a device. In some examples, detect module 334 can detect the absence of AC input power from an AC input into a device.

The permit module 336 can cause a transistor to permit a power module to provide AC power to a first set of power outlets and concurrently permit the power module to provide DC power to a second set of power outlets in response to an absence of AC input power from the AC input. Causing refers to directly causing a transistor (e.g., switching circuitry included in a transistor) to interrupt power supplied to the second set of power outlets when the detect module 334 detects the absence of AC input power from an AC input into the device.

As used herein, "logic" is an alternative or additional processing resource to perform a particular action and/or function, etc., described herein, which includes hardware, e.g., various forms of transistor logic, ASICs, etc., as opposed to computer executable instructions, e.g., software firmware, etc., stored in memory and executable by a processing resource. As used herein, "a" or "a number of" something can refer to one or more such things. When an element is referred to as being "on," "connected to", "coupled to", or "coupled with" another element, it can be directly on, connected, or coupled with the other element or intervening elements may be present.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed is:

1. A device, comprising:
    a power module connected to a first power outlet and a second power outlet;
    a controller to:
    detect a connection of an alternating-current (AC) input to the device; and
    permit the power module to concurrently provide alternating-current (AC) power to the first power outlet and direct-current (DC) power to the second power outlet by switching a transistor including switching circuitry from a closed position to an open position in response to an absence of AC input power from the AC input to the device, where the transistor, when in the closed position, allows AC power to flow to the first power outlet and the second power outlet.

2. The device of claim 1, wherein the power module is connected to the first power outlet by a bidirectional inverter-charger.

3. The device of claim 1, wherein the power module is connected to the second power outlet by a switch.

4. The device of claim 1, wherein the first power outlet and the second power outlet are connected by the transistor including switching circuitry.

5. The device of claim 1, wherein the controller causes AC power from the AC input to be provided to the power module via a bidirectional inverter-charger when the AC input is providing power to the device.

6. A method, comprising:
    detecting, by a controller, an absence of AC input power from an alternating-current (AC) input to a first power outlet and a second power outlet of a device;
    switching, by the controller, a transistor with switching circuitry connecting the first power outlet and the second power outlet in response to the absence of AC input power from the AC input;
    switching, by the controller, a switch connecting a power module of the device and the second power outlet in response to the absence of AC input power from the AC input; and
    providing, from the power module of the device, AC power to the first power outlet concurrently with providing direct-current (DC) power to the second power outlet in response to the absence of AC input power from the AC input to the device.

7. The method of claim 6, wherein providing the DC power to the second power outlet includes modifying a DC voltage of the DC power from the power module by a DC-DC converter connecting the power module, the switch, and the second power outlet.

8. The method of claim 6, wherein the method includes switching the transistor open in response to the absence of AC input power from the AC input.

9. The method of claim 6, wherein the method includes providing DC power to the power module when the AC input is providing power via a bidirectional inverter-charger, wherein the bidirectional inverter-charger converts AC power from the AC input to DC power.

10. The method of claim 6, wherein the AC input provides the AC power to the first power outlet and the second power outlet when the AC input is providing power.

11. The method of claim 6, wherein the method includes switching the transistor closed in response to power from the AC input being reestablished.

12. A controller comprising a processing resource in communication with a memory resource including instructions to:
   detect a connection of an alternating-current (AC) input; and
   cause a transistor to permit a power module to provide AC power to a first power outlet and concurrently permit the power module to provide direct-current (DC) power to a second power outlet in response to an absence of AC input power from the AC input, where the transistor, when in the closed position, allows AC power to flow to the first power outlet and the second power outlet.

13. The controller of claim 12, wherein the AC power is provided to the first power outlet from the power module via a bidirectional inverter-charger.

14. The controller of claim 12, wherein the DC power is provided to the second power outlet from the power module via a switch.

15. The device of claim 1, wherein the power module comprises at least one energy storage element capable of providing stored electrical energy to at least one of the first power outlet and the second power outlet.

16. The device of claim 1, the controller to:
   prevent the power module from concurrently providing AC power to the first power outlet and DC power to the second power outlet by switching the transistor from the open position to the closed position in response to power from the AC input to the device being reestablished.

17. The method of claim 6, wherein the power module comprises at least one energy storage element capable of providing stored electrical energy to at least one of the first power outlet and the second power outlet.

18. The controller of claim 12, wherein
   the transistor, when in the closed position, allows AC power to flow from the AC input through the transistor to the first power outlet and the second power outlet.

19. The controller of claim 18, wherein the instructions comprise instructions to:
   switch the transistor from the open position to the closed position in response to power from the AC input being reestablished.

20. The controller of claim 12, wherein the power module comprises at least one energy storage element capable of providing stored electrical energy to at least one of the first power outlet and the second power outlet.

* * * * *